United States Patent Office 3,255,158
Patented June 7, 1966

3,255,158
PREPARATION OF ACRYLONITRILE POLYMERS USING A CATALYTIC SYSTEM CONTAINING A HIGH RATIO OF ACTIVATOR/CATALYST
Harrison I. Anthes, Waynesboro, Va., assignor to E. I. du Pont de Nemours and Company, Wilmington, Del., a corporation of Delaware
No Drawing. Filed Jan. 15, 1962, Ser. No. 166,396
6 Claims. (Cl. 260—79.3)

This application is a continuation-in-part of my copending application Ser. No. 597,323, filed July 12, 1956, now abandoned.

This invention relates to acrylonitrile polymers and more specifically to the production of such polymers and shaped structures therefrom such as fibers, film and the like with improved whiteness and color stability.

Acrylonitrile polymers having about 85% or more acrylonitrile content are commonly prepared from aqueous monomer solutions or dispersions using a persulfate catalyst, such as sodium or potassium persulfate, activated by a sulfoxy reducing agent, such as sodium or potassium metabisulfite. The ratio of activator to catalyst is usually maintained below two parts of activator to each part of catalyst and such ratio gives good yields of polymer. While this procedure is satisfactory as far as yield is concerned, the polymers produced are not as white as desired and are not resistant to discoloration upon heating.

In the preparation of filaments, the acrylonitrile polymer is dissolved in an organic solvent such as N,N-dimethylformamide which requires heating a slurry of the polymer in the solvent for a time to effect solution. The solution also is maintained at an elevated temperature while it is filtered and spun. Any color instability inherent to the polymer results in fibers which may vary from a cream to light tan and no practical method is known at present for converting these off-color textiles permanently to white. Sometimes bleaching is resorted to but this does not result in a permanent color removal since the bleached textiles will again darken on exposure to ultra-violet light.

It is, therefore, an object of this invention to produce white filaments, fibers, yarns, film and other shaped products from acrylonitrile polymers and copolymers containing at least about 85% acrylonitrile. Another object is the provision of a modification of existing methods of producing an acrylonitrile polymer which results in permanently white filaments. A still further object is a method which produces white filaments which need not be bleached. Other objects will appear as the description of the invention proceeds.

These and other objects are accomplished by aqueous polymerization of acrylonitrile either alone or in combination with at least one additional copolymerizable monomer to produce polymers in which the acrylonitrile content is not less than about 85%, the polymerization being accomplished in the presence of a persulfate, a sulfoxy reducing agent and a catalytic quantity of soluble iron salt as the polymerization initiating system in which the weight ratio of sulfoxy reducing agent to persulfate, as exemplified by sodium meta bisulfite and potassium persulfate, respectively, is maintained at least as high as about 10 to 1 and preferably as high as about 20 to 1. There is no upper limit to the ratio as far as effectiveness in producing said polymers is concerned, although ratios above about 2000 to 1 decrease the yield to unacceptable levels.

To achieve the benefit of this invention, it is important that the polymerization be conducted in such a way that no more monomer is present at any time than is soluble in the reacting mass. This restriction has been found of practical significance only in the case of batch polymerizations wherein the limited solubility of acrylonitrile makes it necessary to employ an emulsion of monomer in water in order to obtain a reasonable space-time yield. Such a procedure is incapable of producing excellent white acrylic polymers by this invention. In constant-environment, continuous polymerizations, wherein all ingredients are fed into a large, continuously overflowing vessel, it has been found that amounts of monomer may be fed which are substantially in excess of that known to be soluble in the amount of water fed therewith without the appearance in the reaction zone for any finite period of time of more monomer than is soluble therein. It is necessary only that the polymerizing slurry be well-stirred to achieve this result; conventional stirring equipment has been found adequate for this purpose. Samples removed from such a continuous process operating under steady-state conditions and instantly "shortstopped" by complexing the iron catalyst with an agent such as ethylenediaminetetraacetic acid and raising the slurry pH to above 7.0 are consistently found by analysis to represent conversion to polymer of more than that fraction of the feed monomer which is in excess of monomer solubility in the medium. The solubility of acrylonitrile in water is given as a function of temperature in FIGURE 6, page 8 of The Chemistry of Acrylonitrile, second edition, published by American Cyanamid Company in 1959.

The invention is concerned primarily with polymers which when spun into filaments, yarns, fibers and the like, produce white products which retain their whiteness on exposure to ultra-violet light. Since the term "white" is relative and an object is though to be white only when no whiter object is in sight, it is desirable to define the term as used in the specification and claims. Since the polymers prepared according to the present invention are used primarily in the preparation of fibers and filaments, these are used to evaluate the color of the polymer. To determine the fiber color values, hereafter abbreviated to FCV for convenience, staple fibers are first prepared by scouring at the boil for 30 minutes in deionized water containing 0.1% of a nonionic surface-active agent. The samples are then rinsed twice in deionized water, squeezed and centrifuged to remove any excess, after which they are allowed to dry in air at room temperature. A portion of the prepared dry sample weighing about 2 grams is carded to parallelize the fibers by means of a hand card to give a pad of staple fibers about 3 x 6" which is folded once lengthwise. The reflectance ratios of the samples in the "green" and "blue" filter settings of the instrument are measured using a commercially available reflectance colorimeter calibrated against the manufacturer's standard reflectance plates and National Bureau of Standards certified reflectance plates. Two readings are taken on each side of the sample, the second measurement being made with the sample rotated 90° from the position of the first reading. Fiber color values are then calculated from the average of the four readings using the following formula:

$$FCV = \frac{r.\,r.\,green - r.\,r.\,blue}{r.\,r.\,green} \times 100$$

where, R.R. green stands for reflectance ratio with the green filter and R.R. blue stands for reflectance ratio with the blue filter.

Color measurements made on a number of various "white" samples of combed staple pads were recorded and are tabulated below as follows:

|  | FCV |
|---|---|
| Cellulose acetate "white" fibers of commerce | 3.5–4 |
| Nylon "white" fibers of commerce | 4–6 |
| "Dacron" polyester "white" fibers of commerce | 4–6 |
| Prior art acrylonitrile polymer fibers of commerce called "white" | 8–18 |
| "White" acrylonitrile polymer fibers of this invention | 1.4–6 |

It will be apparent, therefore, that fibers prepared according to this invention are much whiter than the best prior art acrylonitrile fibers and compare favorably with other synthetic fibers.

As mentioned above bleached acrylonitrile fibers darken again after being exposed to ultraviolet light. In order to demonstrate this fact, samples of acrylonitrile copolymers of the prior art and the white fibers having a fiber color value below 6 prepared according to the present invention were tested. In the test, fiber color values were obtained before and after exposure to ultraviolet light in a color Fade-Ometer for 20 hours at 90° F. One sample of the prior art fibers was bleached with acidified sodium chlorite solution, simulating commercial bleaching, followed by treatment with sodium bisulfite as an antichlor, after which the fibers were rinsed and dried. A comparison of the fiber color values is given below:

| Sample | Fiber Color Value | |
|---|---|---|
|  | Unexposed Samples | Exposed 20 Hours |
| Unbleached prior art staple | 12.6 | 9.0 |
| Bleached prior art staple | 5.7 | 11.1 |
| Unbleached white staple of this invention | 5.8 | 4.3 |

These results clearly show that chemically bleached acrylonitrile polymer fibers darken under ultraviolet light while untreated samples become whiter.

Another test for ultimate whiteness of the fibers and color stability of the polymer against heat is termed "heated color value" test abbreviated to HCV. This test is conducted on samples of the polymer and will foretell the degree of whiteness that may reasonably be expected in the finished filaments, yarns and fibers produced therefrom. A comparison of heated color values with color values is also interesting in showing color stability of polymer samples when subjected to heating. Both tests are explained in the following paragraph.

The color value test consists in preparing a standard solution such as a 5.8% solution of the polymer in pure N,N-dimethylformamide free of dimethylamine and measuring the optical density of the solution at 400 millimicrons against a sample of pure solvent using a commercially available spectrophotometer. The optical density times 100 is taken as the color value ("CV") of the polymer. Because the color may increase several fold, for instance from 5 to 25, when solutions of the polymer are maintained at elevated temperatures for a time, the test was adapted to measure "heated color values" ("HCV"). This is done by heating a sample of 25% dimethylformamide solution of polymer at 100° C. for four hours and then testing a sample of this solution diluted to the standard testing concentration (5.8% polymer) as just previously described. The heated color values of the polymers are quite comparable to actual measured fiber color values of fibers produced if the temperature and time of heating is reasonably equivalent to the "hold-up" time of the polymer in solution prior to spinning. A low HCV is not so much indicative of a low initial color value of the polymer as it is of greater stability in retaining the initial whiteness and foretells the ultimate color of the filaments, yarns and fabrics produced therefrom.

It so happens that there is a general proportional relationship betwen the HCV, and fiber color values (FCV). For instance, a fiber having a FCV of 2 may be prepared by a common dry-spinning process from a polymer having a HCV of about 6. If the HCV test of the polymer gives a value of 12 or 13, with normal solution preparation and dry spinning a fiber having a FCV of about 6 may be produced. The HCV results may be used with reasonable accuracy in predicting the FCV that will result from normal handling and spinning of the polymer as is illustrated in Example VI.

It has been found that the proces of this invention results in substantially fewer sulfate end groups combined in the polymer. Sulfate end groups are half-ester salts, the sulfur being attached to the carbon chain through an oxygen atom. In the case of sulfonate, the sulfur is attached to a carbon of the polymer chain directly. Although not fully understood, it appears that low frequency of sulfate groups results in a product of improved whiteness retention. It is known that the sulfate groups are more easily removed by hydrolysis, and it appears that the structure remaining after hydrolysis is in some manner more easily converted to the colored molecule. It has been found that combined sulfate amounting to about 6.0 milliequivalents per kilogram (meq./kg.) or less is satisfactory for the purposes of this invention, while polymers of poor color stability result from the combination of as much as 8 meq./kg. of sulfate.

The relative ease of hydrolysis of the sulfate end groups provides a convenient means for distinguishing between combined sulfate and sulfonate. Hydrolysis of the sulfate is accomplished by boiling a slurry of 15 grams of finely divided polymer in 98 ml. of water containing 0.2 gram oxalic acid for 4 hours. The polymer is then filtered off, washed thoroughly with water and analyzed by the procedure which follows:

A 1-inch diameter tube equipped with a stop cock at the lower end and having a total capacity of 500 ml. is charged successively with 200 ml. of dehydrated "Amberlite" IR-120H resin and 200 ml. of MB-3 resin so that the MB-3 resin is in the upper part of the column. Both of these resins are available commercially in a water-wet form. They are dehydrated by slurrying in dry acetone, filtering and then continuously washing in a flooded bath with dry acetone until no further shrinkage of the resin bath occurs. The acetone is then displaced by dry deionized dimethylformamide (DMF). The resin is stored under DMF until used in the analysis.

To a 2.5 gram sample of polymer in 250 ml. of dry deionized DMF is added a small amount of a pH indicator comprising equal parts of 0.01% alcoholic solutions of Neutral Red and Xylene Cyanol FF indicators. The polymer solution is passed through the prepared resin column at a rate of about 10 ml. per minute. The resin bath is kept covered by liquid during this procedure, deionized DMF being used at the end to displace the last of the sample. The indicator serves to distinguish the acidic polymer solution from the pure DMF at both the beginning and the end of the sample emergence from the column.

A portion of the deionized polymer solution, in which the polymer now exists in the free acid form, is evaporated to dryness to determine solids content. Another portion is then titrated with alcoholic KOH to determine acidity, the added indicator now showing the titration end point. A simple calculation which compares this result with a blank experiment wherein pure DMF replaces the polymer solution establishes the meq./kg. of "acidity" in the original sample.

By conducting a parallel analysis on a sample of the same polymer which has not been hydrolyzed in oxalic acid solution, a somewhat larger value of meq./kg. will be obtained. The difference between the two is taken as the sulfate content of the polymer. Parallel tracer experiments, employing radioactive sulfur in either the persulfate or the bisulfite initiator, confirmed the adequacy of this selective hydrolysis as an analytical procedure.

The following examples are given by way of illustration only and no limitation is placed on the particular polymer or catalyst and activator since any acrylonitrile copolymer having at least 85% acrylonitrile content may be substituted for the polymer given in the examples as will be more apparent from the disclosure following them. Likewise any alkali metal salt may be used in place of sodium and potassium salts of metabisulfite and persulfate, and they may be used in any ratio falling within the limits given above.

EXAMPLE I

In continuous polymerization of acrylonitrile the amounts of potassium persulfate and sodium bisulfite were changed very substantially while maintaining other conditions constant. Each run was carried out in an overflow continuous polymerizer under conditions to give one hour "hold-up" time, i.e. the average residence time of the reactants in the polymerizer was one hour. Initially the polymerizing kettle was half filled with water acidified with sulfuric acid to a pH of 3.75 and heated to 45° C., which temperature was maintained throughout the run. The reactants were continuously added at a constant rate at the percentage levels shown in Table 1 with sufficient water and acid to maintain the one hour "hold-up" time and the pH at 3.75. Each run contained a small controlled amount of iron, i.e. about 0.2 p.p.m. The percent monomer feed (100% acrylonitrile) was based on the total weight of feed while the percent persulfate and bisulfite were based on the weight of monomer in the feed. Monomer concentration at steady state is seen to be 6.3% and 6.8% by calculation from the monomer feed and conversion figures (e.g., 100−69.3=30.7% unconverted; .307×20=6.3%, absolute basis, unconverted). Thus monomer concentration in both cases is less than its solubility in water (about 8.1%) at 45° C. The results are shown in Table 1.

Table 1

| Percent Cat. | Percent Act. | Act: Cat. | Percent Monomer | Percent Conversion | [η] | −OSO$_3$− meq./kg. | "HCV" | Total −OSO$_3$− and −SO$_3$− |
|---|---|---|---|---|---|---|---|---|
| 0.15 | 6.0 | 40.0 | 20 | 66.0 | 1.52 | 4.5 | 13.0 | 28.5 |
| 0.92 | 1.56 | 1.7 | 20 | 69.3 | 1.33 | 17.0 | 25.0 | 45.3 |

It is seen that the HCV is nearly 100% more than with the normal, low ratio of activator to catalyst while the percent conversion and intrinsic viscosity [η] are reasonably comparable.

EXAMPLE II

Two batch polymerizations were run, wherein the amounts of catalyst and activator differed greatly, to produce terpolymers of acrylonitrile, methyl acrylate and sodium styrenesulfonate, the ratio of monomers in the feed being 93.6%, 6% and 0.4%, respectively. In each case the run was made in a stoppered 2-liter Erlenmeyer flask without agitation for 4 hours at room temperature. The pH was adjusted to 3.35 with sulfuric acid. Each charge of about 1400 grams consisted of water in which were dissolved 7% monomer of the composition given, based on total weight of the charge, and amount of soluble iron salt to give 0.2 part per million iron in the reaction mixture and the amounts of potassium persulfate and sodium bisulfite given in Table 2 below. Percentages are based on the monomer weight. Conversions of monomer to polymer were 60% and 65% respectively.

Table 2

| Percent Cat. | Percent Act. | Act:Cat. | −OSO$_3$− meg./kg. | [η] | "HCV" | Total −OSO$_3$− and −SO$_3$− |
|---|---|---|---|---|---|---|
| 0.6 | 6.0 | 10 | 2.76 | 1.73 | 10.9 | 55.6 |
| 2.4 | 4.0 | 1.6 | 11.26 | 1.78 | 22.3 | 78.3 |

It is easily seen that the HCV is substantially lower in the product of higher ratio of activator to catalyst.

EXAMPLE III

Another pair of batch polymerizations run to produce acrylonitrile/methyl acrylate copolymer (94/6) was conducted under conditions similar to Example II except the temperature was maintained at 45° C. The amounts of catalyst and activator used and the results are shown below in Table 3.

Table 3

| Percent Cat. | Percent Act. | Act.:Cat. | [η] | "HCV" |
|---|---|---|---|---|
| 1.0 | 1.7 | 1.7 | 1.55 | 21.5 |
| 0.2 | 6.0 | 30 | 1.50 | 9.3 |

EXAMPLE IV

In another series of tests continuous polymerization was used similar to that described in Example I to produce copolymers of the composition of Example II. The polymer washing water, in some cases, contained about 0.02% of a sequestering agent as indicated below in Table 4. It will be noted that the addition of ethylenediaminetetraacetic acid or oxalic acid to the wash water was effective in further lowering the HCV.

Table 4

| Percent Cat. | Percent Act. | Act:Cat | Int. Visc. | −OSO$_3$− meq./kg. | "HCV" | Wash |
|---|---|---|---|---|---|---|
| 1.0 | 1.7 | 1.7 | 1.25 | 18.0 | 23.0 | Water. |
| 1.0 | 1.7 | 1.7 | 1.25 | ---------- | 14.6 | EDTA.[1] |
| 0.15 | 6.5 | 43 | 1.25 | 5.0 | 9.7 | Water. |
| 0.15 | 6.5 | 43 | 1.25 | ---------- | 7.0 | EDTA.[1] |
| 0.15 | 6.5 | 43 | 1.25 | ---------- | 7.5 | O.A.[2] |

[1] EDTA—0.02% ethylenediaminetetraacetic acid in water.
[2] O.A.—0.02% oxalic acid in water.

EXAMPLE V

To a continuous polymerization vessel partly filled with water acidified with sulfuric acid to a pH of 3.6 and heated to 45° C., a water solution containing 0.5% sulfuric acid, a water solution containing 0.4% potassium persulfate, a water solution containing 8.0% sodium meta-bisulfite, a water solution containing 1.0% sodium styrenesulfonate, and a mixture of acrylonitrile and methyl acrylate were fed together with an amount of water containing a small controlled amount of iron to provide about 0.2 part per million of iron in the reaction mixture and calculated to give a 91 minute holdup time in the reactor after steady-state conditions had been established. The feed composition, expressed as parts by weight, was as given below:

| | Parts |
|---|---|
| Acrylonitrile | 2068 |
| Methyl acrylate | 132 |
| Potassium persulfate | 5.7 |
| Sodium meta-bisulfite | 88 |
| Sodium styrenesulfonate | 5.7 |
| Water plus $H_2SO_4$ to pH 3.6 | 7700.6 |

An atmosphere of inert gas was maintained in the reacting vessel and the temperature was held at 45° C. The copolymer in the reaction mixture overflowing from the reactor was washed free of catalyst, activator and unreacted monomers and then dried to below 1% moisture at a temperature of 108° C. Seventy-three percent conversion of monomers to polymer was obtained, the polymer being of 1.45 intrinsic viscosity. The discoloration tendency of the copolymer expressed in terms of the heated color value was 10.1. The sulfate content, by analysis, was found to be 6.0 meq./kg. Total ionic function ($-OSO_3-$ and $-SO_3-$) amounted to 31.5 meq./kg.

Sufficient dry copolymer was slurried in deionized dimethylforamamide to give a slurry containing 29% polymer and held at a temperature of 55° C. for from 8 to 16 hours. The temperature of the slurry was then raised to 80° C. to effect solution after which it was filtered at a temperature between 80° and 95° C. and advanced with further heating to a multi-hole spinneret from which it was extruded at a temperature of about 140° C. The total residence time at which the solution was maintained at 80° C. or above was about 30 minutes and at over 100° C. for no more than about 5 minutes. The yarn coming from the dry-spinning cell was washed free of solvent with hot water (98° C.), drawn in hot (98° C.) water 4×, crimped, cut into 2-inch lengths, and dried relaxed at 127° C. for 6½ minutes. The fiber color value was 4.8.

EXAMPLE VI

An aqueous solution of 0.01 gram per liter of ethylenediaminetetraacetic acid was prepared in deionized water and 10.71 liters of the solution were added to an unagitated glass polymerizing vessel. Acrylonitrile, methyl acrylate, potassium persulfate, sodium meta-bisulfite and sulfuric acid were then added in the following amounts:

| | Grams |
|---|---|
| Acrylonitrile | 705.0 |
| Methyl acrylate | 45.0 |
| Potassium persulfate | 24.8 |
| Sodium meta-disulfite | 33.0 |
| Sulfuric acid to pH 3.0-3.3. | |

The solution was allowed to stand without agitation for 48 hours at room temperature. Conversion was 46%, intrinsic viscosity $[\eta]$ of the polymer was 1.94, and the heated color value was 2.8. Total ionic content ($-OSO_3-$ and $-SO_3-$) was, by analysis, 17.8 meq./kg. Combined sulfate ($-OSO_3-$) was 2.5 meq./kg. A spinning solution prepared and spun as in Example VI gave fibers when similarly drawn, crimped and cut into staple and dried relaxed having a fiber color value of 1.4.

The invention is applicable to polymerization of acrylonitrile with a wide variety of other ethylenically, unsaturated copolymerizing compounds such as vinyl acetate, methyl vinyl ketone, methyl methacrylate, dimethyl itaconate, butyl methacrylate, butyl acrylate, diethyl maleate, vinyl trimethyl acetate, methacrylonitrile, styrene, vinyl ethyl hexyl ether, octyl methacrylate, alphamethylstyrene, 4-methoxystyrene, ethylenesulfonic acid, allylsulfonic acid, methallylsulfonic acid, halogenated monoethylenic compounds, N-vinyl compounds, etc. Two or more copolymerizing compounds may be used as desired. Neutral monomers alone may be used to give better dyeing by virtue of opening up the polymer structure but preferred copolymers are those that contain both a neutral modifier and a strong acid group such as acrylonitrile 85-95%, methyl acrylate, vinyl acetate, methyl vinyl ketone, etc. 14-4% and a copolymerizable sulfonate such as sodium or potassium styrenesulfonate, 0.1-5%.

Filaments, yarns, fibers and the like from copolymers containing no more than about 0.1 to 0.2% of a copolymerizable sulfonate will exhibit good dyeability with basic dyestuffs and copolymers such as prepared under Examples V and VI exhibit excellent dyeability with basic dyestuffs and where produced in accordance with this invention also yield fibers having a high degree of whiteness that permits applications of bright colors thereto even in pastel shades. The greater retention of initial whiteness even when heated to elevated temperatures makes the acrylonitrile polymers of this invention admirably suited for all kinds of fine textiles such as shirtings, fine jerseys, dress goods and the like especially for white goods or goods dyed in pastel shades.

It will be apparent that many widely different embodiments of this invention may be made without departing from the spirit and scope thereof, and therefore it is not intended to be limited except as indicated in the appended claims.

I claim:

1. In a process of preparing acrylonitrile polymers in which monomeric material containing at least 85% acrylonitrile and from 0 to 15% of at least one other ethylenically unsaturated monomer copolymerizable therewith is polymerized in an aqueous system in the presence of a persulfate catalyst and an activator comprising a sulfoxy reducing agent, the improvement to produce white color-stable polymer comprising polymerizing the monomeric materials in an aqueous system in which the concentration of the acrylonitrile is such that it is soluble in the water present and using a ratio of activator to catalyst that is at least 10:1 by weight.

2. The process of claim 1 in which the activator is sodium meta-bisulfite, the catalyst is potassium persulfate and the polymerization mixture contains about 0.2 part per million of iron.

3. The process of claim 1 in which the monomer, water, catalyst, and activator are fed continuously into the polymerization zone, and maintaining therein constant-environment continuous polymerization.

4. The process of claim 1 in which the said monomeric material contains from 0.1-5% of an alkali metal styrenesulfonate and about 4% to 14% methyl acrylate.

5. The process of preparing white color-stable acrylonitrile polymers which comprises polymerizing at about 45° C. about 22 parts of monomeric material containing at least 85% acrylonitrile, the balance being an ethylenically unsaturated monomer copolymerizable with the acrylonitrile to produce a copolymer of a whiteness substantially equal to that of acrylonitrile, about 77 parts water, about 0.2 part per million of iron, and sufficient sulfuric acid to bring the mixture to a pH of about 3.6 with a catalytic amount of a persulfate catalyst and at least 10 times the said amount of a sulfoxy reducing agent as an activator, all parts and amounts being by weight with the monomeric acrylonitrile being solubilized in the water present.

6. The process of claim 5 in which the said monomeric material contains from 0.1–5% of an alkali metal styrenesulfonate and about 4% to 14% methyl acrylate.

References Cited by the Examiner

UNITED STATES PATENTS

| | | | |
|---|---|---|---|
| 2,486,241 | 10/1949 | Arnold | 260—85.5 |
| 2,743,263 | 4/1956 | Coover et al. | 260—85.5 |
| 2,777,832 | 1/1957 | Mallison | 260—88.7 |
| 2,837,501 | 6/1958 | Millhiser | 260—63 |
| 3,025,278 | 3/1962 | Pitts | 260—88.7 |

JOSEPH L. SCHOFER, *Primary Examiner.*

LOUISE P. QUAST, DONALD CZAJA, LEON J. BERCOVITZ, *Examiners.*